July 19, 1960  W. STELZER  2,945,728
TRACTOR-TRAILER BRAKE SYSTEM
Filed March 28, 1956  2 Sheets-Sheet 1
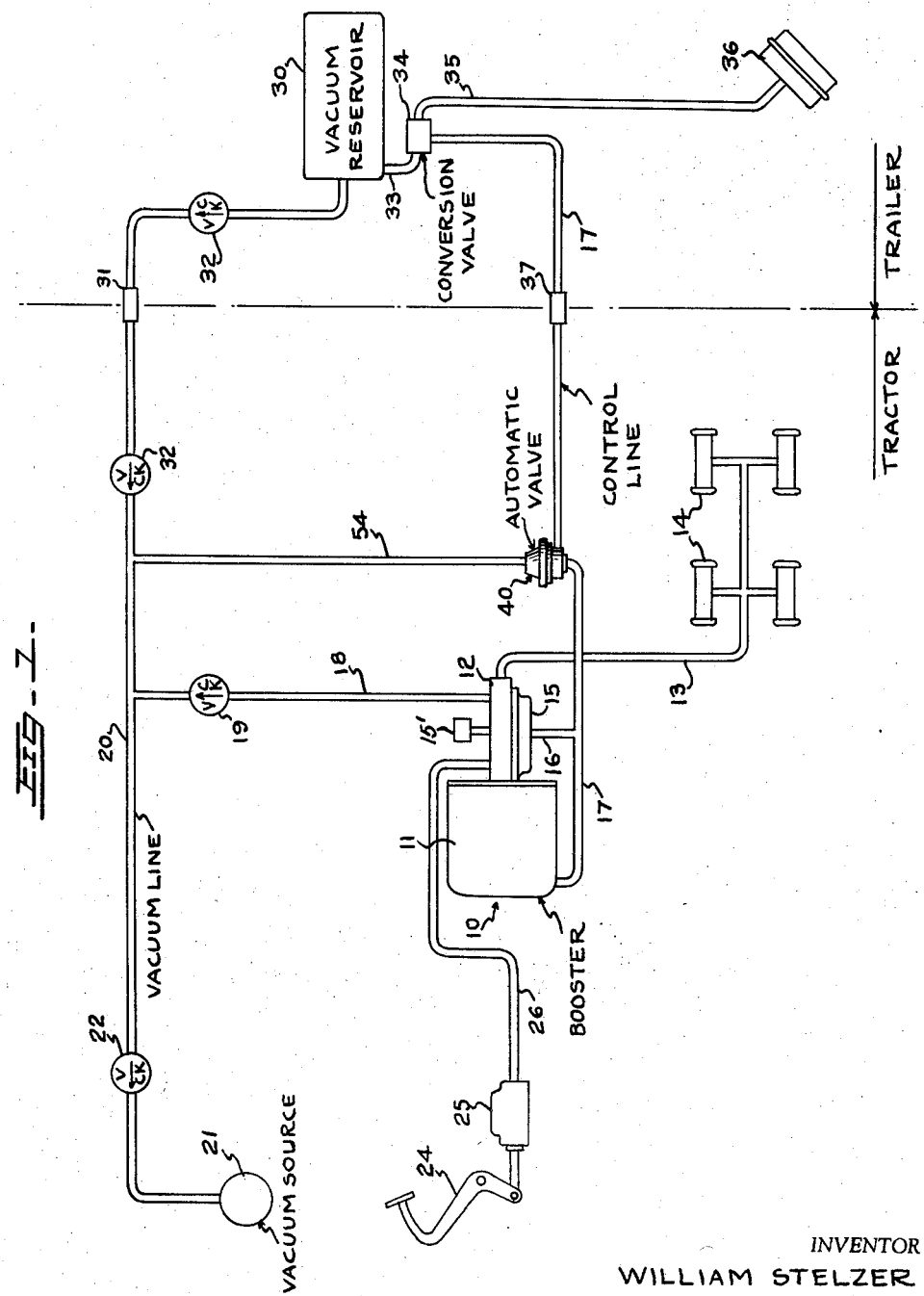
INVENTOR
WILLIAM STELZER
BY John F. Phillips
ATTORNEY July 19, 1960
W. STELZER
2,945,728
TRACTOR-TRAILER BRAKE SYSTEM
Filed March 28, 1956
2 Sheets-Sheet 2
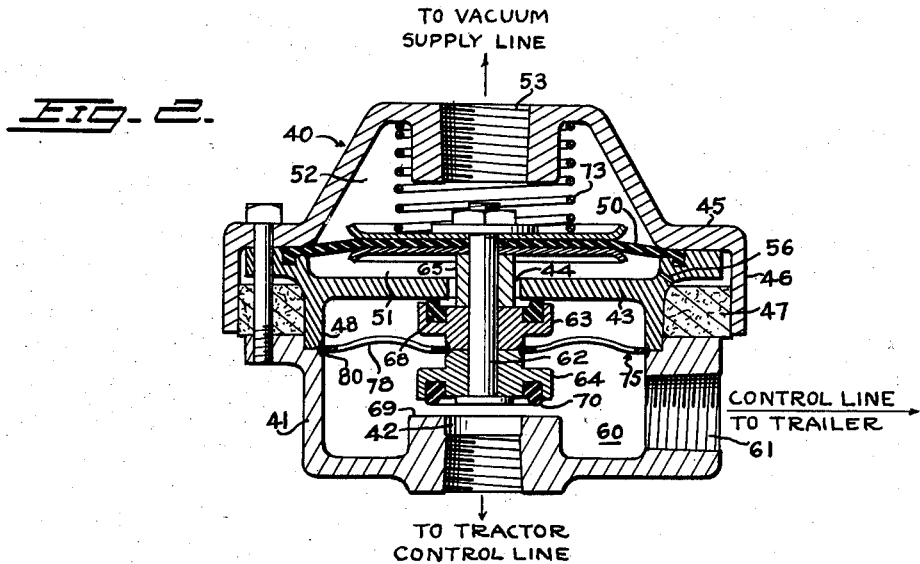
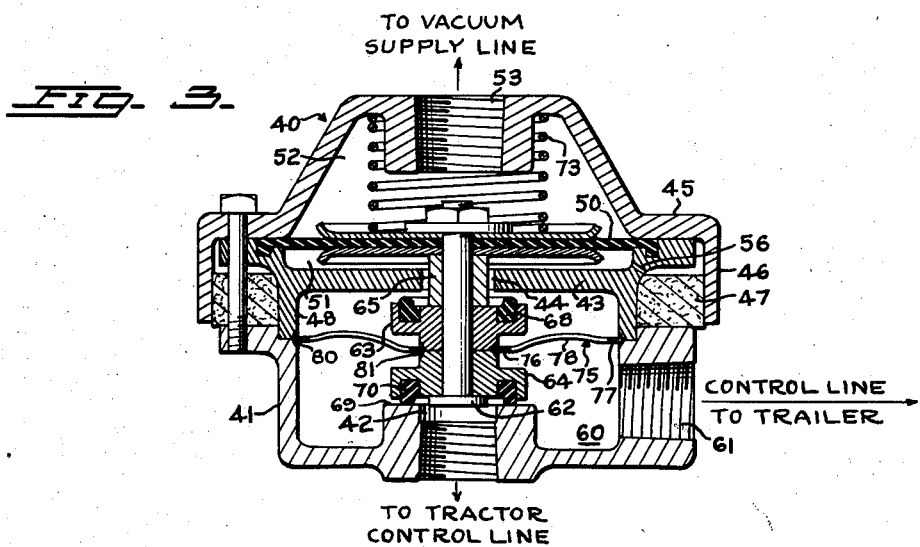
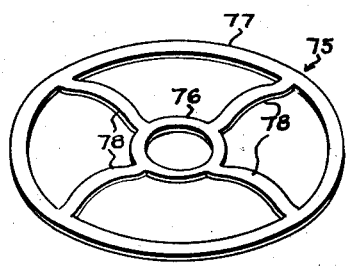
INVENTOR
WILLIAM STELZER
BY John F. Phillips
ATTORNEY United States Patent Office 2,945,728
Patented July 19, 1960

2,945,728

TRACTOR-TRAILER BRAKE SYSTEM

William Stelzer, Summit, N.J., assignor to Kelsey-Hayes Company, a corporation of Delaware Filed Mar. 28, 1956, Ser. No. 574,469

16 Claims. (Cl. 303—63)

This invention relates to a tractor-trailer brake system.

Many tractor-trailer brake systems embody a vacuum-operated brake booster motor on the tractor the energization of which, upon operation of the brake pedal, controls a conversion valve to connect the brake operating motors of the trailer to a vacuum reservoir for energizing the trailer brake motors. The vacuum reservoir on the trailer is connected by a vacuum supply line to a vacuum source on the tractor, usually the engine intake manifold, for maintaining the reservoir evacuated so that its vacuum supply is always ready to energize the booster brake motors. The vacuum supply line is intended to maintain a predetermined vacuum in the trailer reservoir for the proper application of the trailer brakes. Occasionally it occurs that the vacuum in the supply line decreases due to a possible variety of reasons, for example, leakage in the vacuum supply line. Many tractor-trailer brake systems are equipped with pressure gages in the cab of the tractor, and the driver should stop and investigate the cause of any drop in vacuum in the supply line so as to maintain the proper vacuum in the reservoir. However, drivers of such vehicle combinations are prone to ignore drops in vacuum which they believe not to be dangerous, feeling that they can reach their next stopping point without stopping the vehicle to determine the cause involved in the drop in vacuum. This may result in a substantial element of danger if it becomes necessary to stop the tractor and trailer quickly.

An important object of the present invention is to provide a means automatically operative upon a drop in vacuum in the supply line to a predetermined point, for example, to 8–10" of mercury, for effecting an application of the trailer brakes to bring the vehicles to a stop.

A further object is to provide a tractor-trailer brake system with an automatic valve which accomplishes the results stated above without affecting in any way the operation of the tractor booster brake mechanism.

A further object is to provide in a system of the character referred to an automatic valve which is arranged in the control line commonly connected between the tractor booster motor and the trailer conversion valve to render the latter subject to operation in accordance with booster motor energization, the automatic valve being subject to operation in accordance with vacuum in the supply line so as to cut off communication through the control line, if supply line vacuum drops below a predetermined point, and to apply the trailer brakes.

A further object is to provide such an automatic valve which functions upon a drop in vacuum in the supply line to cut off communication between the forward and rear ends of the control line and to dump air into the rear end of the control line to operate the conversion valve to effect the operation of the trailer brakes to bring the tractor-trailer to a stop.

A further object is to provide such an automatic valve wherein a snap-over valve action is provided to relatively quickly open the rear end of the control line to the atmosphere and close the forward end of the control line when a predetermined drop in vacuum occurs in the supply line, even though such drop occurs very gradually.

Other objects and advantages of the invention will become apparent during the course of the following description.

In the drawings I have shown one embodiment of the invention. In this showing:

Figure 1 is a diagrammatic view of a tractor-trailer brake system showing the automatic valve in the control line of the system;

Figure 2 is an enlarged axial sectional view through the automatic valve showing the parts in their normal positions;

Figure 3 is a similar view showing the parts of the automatic valve in the positions they will occupy upon a predetermined vacuum drop in the supply line; and Figure 4 is a detail perspective view of one type of snap-over spring device which may be used with the automatic valve.

Referring to Figure 1, the numeral 10 designates a booster unit as a whole mounted on the tractor. This booster unit may be of the type disclosed in the copending application of Jeannot G. Ingres, Serial No. 455,647, filed September 13, 1954, now Patent No. 2,905,151, granted September 22, 1959. Such a booster unit comprises a motor 11 having a pressure responsive unit (not shown) therein operative for moving a plunger (not shown) mounted for movement into a housing 12 to displace fluid therefrom through lines 13 into the tractor brake cylinders 14. The booster motor 12 is controlled by a valve mechanism as disclosed in the copending application referred to. Such valve mechanism has been generally indicated by the numeral 15 and is connected by a pipe 16 to a control line 17 the forward end of which is connected to one end of the booster motor 11. The valve mechanism normally maintains vacuum in the line 17 and since the other end of the motor 11 is constantly connected to a source of vacuum, the motor 11 is normally vacuum suspended. When the valve mechanism is operated in the manner to be described, the lines 16 and 17 are disconnected from the source of vacuum and connected to the atmosphere, and the admission of air into the front end of the motor 11 operates the pressure responsive unit to displace fluid into the wheel cylinders 14.

Air is preferably supplied to the valve mechanism 15 through an air cleaner 15'. The valve mechanism is connected to a suitable source of vacuum through a line 18. This line is preferably provided with a check valve 19 and is shown as being tapped into a vacuum supply line 20 leading to a vacuum source 21 which may be of any desired type such as the intake manifold of a motor vehicle engine. Forwardly of the point of connection of the line 18 thereto, the line 20 is preferably provided with a check valve 22.

The valve mechanism is adapted to be operated by depressing a conventional brake pedal 24 connected to the usual master cylinder 25 having therein a fluid displacing plunger (not shown) for forcing fluid through a hydraulic line 26 leading to the valve mechanism 15. In accordance with the disclosure of the copending application referred to, fluid flowing through the line 26 not only operates the valve mechanism but also assists the motor operated plunger in displacing fluid from the housing 12.

The trailer is provided with the usual vacuum reservoir 30 communicating with the line 20, and the latter is provided with the usual connector 31 forwardly and rearwardly of which may be arranged check valves 32. The reservoir 30 is connected as at 33 with a conversion valve 34 from which a line 35 is shown as leading to one of the trailer brake operating motors 36. It will be apparent that one of these motors is employed for the brakes of each trailer wheel. The control line 17 is connected to the conversion valve 34 in the usual manner, a conventional connector 37 being arranged in the line 17 between the tractor and the trailer.

The forward and rear ends of the control line 17 are normally in open communication with each other, as further described below. When the pipe 16 is connected to the source of vacuum under normal conditions, vacuum exists throughout the line 17 and the motor 11 is deenergized while the conversion valve 34 disconnects the reservoir 30 from the trailer brake motor 36. When the pedal 24 is operated, the pipe 16 is disconnected from the source of vacuum and connected to the atmosphere to admit air into the forward end of the motor 11 and into the conversion valve 34. Thus the motor 11 will be energized and the conversion valve 34 will be operated to connect the trailer brake motor to the vacuum reservoir, thus applying the trailer brakes as the tractor brakes are employed.

As previously stated, a predetermined degree of vacuum should be maintained at all times in the vacuum line 20 in order to maintain the reservoir 30 properly evacuated. If a pressure increase occurs forwardly of the reservoir 30, any of the check valves 22 or 32 will close and maintain proper vacuum in the reservoir 30. After a brake operation, however, there will be an increase in pressure in the reservoir 30 and any leak which has occurred in the supply line 20 will prevent proper evacuation of the reservoir. If vacuum in the line 20 decreases to a predetermined extent, the driver should stop the tractor-trailer and investigate the trouble. The present invention is particularly intended to force the driver to stop under the conditions referred to.

The automatic stopping of the vehicle is caused to take place through the operation of an automatic valve indicated as a whole by the numeral 40 and shown in detail in Figures 2 and 3 of the drawings. Referring to such figures, the valve device 40 comprises a lower housing 41 having a lower port 42 connected to the forward end of the control line 17. A dividing wall 43 has a depending flange 48 fitting into the top of the housing 41, and the wall 43 is provided therethrough with an opening 44. An upper housing or cap 45 has a depending flange 46 surrounding the outer extremity of the wall 43 and maintains in position outwardly of the flange 48 and above the housing 41 an annular air cleaner 47.

The upper housing 45 and wall 43 cooperate to clamp in position the periphery of a diaphragm 50. This diaphragm forms with the wall 43 a lower chamber 51 and forms with the upper housing 45 an upper chamber 52. This chamber is connected through an opening 53 with a pipe line 54 (Figure 1) tapped into the vacuum line 20. It will be apparent, therefore, that the chamber 52 is always connected to the source of vacuum. The wall 43 is provided with a restricted port 56 connecting the chamber 51 to the atmosphere through the air cleaner 47.

The wall 43 and lower housing 41 form therewithin a chamber 60 in fixed communication through an opening 61 with the rear end of the control line 17. The diaphragm 50 carries a stem 62 projecting downwardly into the chamber 60, and within such chamber, valve bodies 63 and 64 surround the stem 62. A spacer 65 surrounds the stem 62 between the valve body 63 and the diaphragm 50 and is of substantially smaller diameter than the opening 44 so that the latter is always in open communication with the chamber 51.

The bottom of the wall 43 forms a valve seat engageable with a valve element 68 carried by the valve body 63, the valve element 68 being normally in closed position as shown in Figure 2. The housing 41 around the opening 42 forms a valve seat 69 engageable by a valve element 70 carried by the valve body 64. The valve element 70 is normally open as shown in Figure 2.

Within the chamber 52 is arranged a spring 73 engaging at its opposite ends against the diaphragm 50 and upper housing 45 to urge the diaphragm 50 downwardly. Thus the valve elements 68 and 70 are spring-biased to the position shown in Figure 3 but are normally held in the position shown in Figure 2 by atmospheric pressure in the chamber 51 while vacuum is present in the chamber 52.

A snap-over spring device is provided for urging the valve bodies 63 and 64 downwardly after the valve element 68 is "cracked" under conditions to be described. A suitable snap-over valve device is illustrated in Figure 4 and is indicated as a whole by the numeral 75. The spring device comprises an inner ring 76, an outer ring 77, and spring fingers 78 connected between the rings 76 and 77. The elements of the spring device 75 may be integral, and this device will appear in the nature of a spider as shown in Figure 4. After the blanking of the spring device, the spring fingers 78 are stamped to bulge intermediate their ends as shown in Figures 2, 3 and 4 to exert radial forces against the rings 76 and 77. When the ring 76 is below the plane of the ring 77 as in Figure 3, there will be present an axially downward component of spring force biasing the valve element 70 to closed position, as further referred to below. The junction point between the flange 48 and lower housing 41 is annularly grooved as at 80 to receive the periphery of the ring 77. The junction point of the valve bodies 63 and 64 is grooved as at 81 to receive the inner periphery of the ring 76.

*Operation*

The parts of the automatic valve are normally arranged as shown in Figure 2. The brake pedal 24 is released, and accordingly the pipes 16 and 17 are connected to the vacuum pipe 18 and the motor 11 will be vacuum-suspended. Vacuum will be present throughout the control line 17 due to the fact that the valve element 70 is normally open as shown in Figure 2. Thus the conversion valve will close the line 35 to the vacuum reservoir 30 and maintain it open to the atmosphere and accordingly the trailer brakes will be inoperative. It will be apparent that the chamber 52 is always in communication with the vacuum source through lines 54 and 20, and since atmospheric pressure will be present in the chamber 51 through the bleed port 56, differential pressures acting on the diaphragm 50 will maintain the spring 73 compressed. Accordingly, the valve element 68 will be closed and the valve element 70 will be open to maintain unrestricted communication through the control line 17. The positions of the parts in Figure 2 will be maintained so long as vacuum is above a predetermined minimum, for example, 8–10" of mercury, in the line 20. Thus the conversion valve 34 is always subject to operation in accordance with the operation of the booster motor 11.

When the brakes are to be applied, the pedal 24 will be depressed to operate the valve mechanism 15 to disconnect the pipe 16 from the vacuum source and connect it to the atmosphere through the air cleaner 15'. Air will be admitted into the booster motor through the line 17, thus operating the booster motor to apply the tractor brakes through operation of the wheel cylinders 14.

When air is admitted into the forward end of the line 17, a pressure rise will occur throughout the line 17, the valve element 70 being open as in Figure 2, as previously stated. Through the control line 17, air will be admitted to the conversion valve 34, thus operating this valve to disconnect the trailer brake line 35 from the atmosphere and connect it to the vacuum reservoir to operate the trailer brake motors 36 simultaneously with operation of the booster motor 11. The brakes are released in the usual manner merely by releasing the brake pedal 24.

From the foregoing, it will be apparent that the automatic valve as shown in Figure 2 permits normal operation of the tractor and trailer brakes of the system. The automatic valve, however, functions when vacuum in the line 20 drops to the predetermined minimum referred to above, and for which minimum the automatic valve is designed. The minimum vacuum at which the automatic valve becomes operative will depend upon the area of the diaphragm and hence the total differential pressure affecting such diaphragm, and the loading of the spring 73. Assuming that a slow leak occurs in the vacuum line 20, a gradual pressure rise will occur therein and a corresponding rise in pressure will occur in the chamber 52. This will cause a decrease in the differential pressures affecting the diaphragm 50. Assuming that the device is designed for a minimum vacuum of 8" of mercury, it will be apparent that when such minimum vacuum is reached, the decrease in differential pressures on opposite sides of the diaphragm 50 will be slightly overcome by the loading of the spring 73. Under such conditions, the diaphragm 50 will move downwardly slightly to "crack" the valve element 68. Since vacuum under normal conditions will be present in the chamber 60, air will be exhausted from the chamber 51 through the opening 44, and a lowering of pressure will occur in the chamber 51 due to the restricted communication between such chamber and the atmosphere through the bleed port 56. This lowering of the pressure in the chamber 51 further tends toward an unbalancing of pressures in opposite sides of the diaphragm 50, thus rendering the spring 73 more effective for moving the diaphragm 50 downwardly. Accordingly, as soon as the valve element 68 is "cracked" to lower pressures in the chamber 51, the diaphragm 50 will be moved downwardly relatively rapidly. Such action fully opens the valve element 68 and closes the valve element 70, thus disconnecting the forward end of the control line 17 from the chamber 60. The opening of the valve element 68 connects the chamber 51 to the chamber 60 and hence to the rear end of the control line 17. Accordingly, air will be bled into the rear end of the control line 17, the rate of the air flow depending upon the area of the bleed port 56. Therefore the conversion valve 34 will be operated to gradually apply the brakes of the trailer and bring the vehicle combination to a stop.

The operation of the elements of the device as described serves to cut off the chamber 60 from the forward end of the control line, thus preventing the admission of air into the forward end of the motor 11 and into the valve mechanism. If the forward end of the line 17 should be opened to the atmosphere, the motor 11 would fail to function since pressures would be balanced in both ends of the motor and the operation of the valve mechanism 15 would not permit the operator to control the tractor brakes. This is particularly important since a rise in pressure in the vacuum line 20 could be due to the trailer breaking away from the tractor, and it is essential under such conditions, of course, that the operator have full control of the tractor brakes.

Therefore, the closing of the valve element 70 preserves the normal operativeness of the booster motor 11, and upon the "cracking" of the valve element 68, it is highly desirable that the valve element 70 be closed as quickly as possible. The speed of movement of the valve element 70 to closed position once the valve element 68 has been "cracked" is greatly increased by the use of a spring device such as the device 75 illustrated in Figure 4. It is preferred that when the parts are in the normal positions, the inner and outer rings 76 and 77 lie in a common plane as shown in Figure 2. Under such conditions, the radial spring forces of the finger 78 will have no vertical component of movement and the force of these spring fingers axially of the stem 62 will be zero. However, immediately upon the "cracking" of the valve element 78, the inner ring 76 will be moved downwardly out of the plane of the outer ring 77. This provides a downwardly acting vertical component of movement as viewed in Figures 2 and 3. The "cracking" of the valve 68 therefore not only lowers pressure in the chamber 51 to render the spring 73 more effective for reversing the positions of the valve elements 68 and 70, but the downward force is added to by the vertical component of movement exerted by the spring fingers 78 on the valve elements 63 and 64. Almost immediately upon the initial "cracking" of the valve element 68, therefore, a snap action is provided to close the valve element 70, thus preventing any appreciable increase in pressure in the forward end of the control line 17. Thus, such portion of the control line will be subject to control by the valve mechanism 15 and in the event of a break-away of the trailer, the driver is enabled to maintain full control of the tractor brakes and bring the vehicle combination to a stop.

From the foregoing, it will be apparent that the present device, while simple in construction, provides a highly important safety factor in the operation of tractor-trailer brake systems. A slow lowering of the vacuum in the supply line 20 incident to a slow leak therein effects the application of the trailer brakes and thus brings the vehicle combination to a stop. Accordingly the driver is prevented from taking a chance on proceeding with insufficient vacuum present in the line 20 to maintain proper evacuation of the reservoir 30. While the trailer brakes are thus applied automatically whether rising pressure in the line 20 occurs gradually or suddenly, the driver is enabled to maintain full control over the tractor brakes to enable him to operate the pedal 24 and stop the tractor if the trailer should break away from the tractor.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a remote control brake system having power means including a vacuum line providing vacuum power for applying the brakes, a control line to be normally subjected to a vacuum condition to provide a released brake condition and providing a brake-applied condition when subjected to higher pressure, remote means responsive to pressures in one end of said control line to control said power means, and means connected to the other end of said control line for effecting variations in pressure therein, in combination, a valve device between said ends of said control line comprising a control chamber directly communicating with said one end of said control line and having a port normally connecting it to said other end of said control line, a normally open first valve controlling said port, an atmospheric chamber having a valve seat between such chamber and said control chamber, a normally closed second valve engaging said seat and connected to said first valve, and means connected to said valves and subject to a predetermined drop in vacuum in said vacuum line for closing said first valve and opening said second valve to disconnect said control chamber from said other end of said control line and connect said atmospheric chamber to said first chamber to increase pressure in said one end of said control line to operate said brakes.

2. A system according to claim 1 provided with means connected to said valves and operative upon initial opening movement of said second valve for applying a biasing force tending to move said first valve to closed position.

3. A system according to claim 1 wherein said means subject to a predetermined drop in vacuum in said vacuum line comprises a diaphragm connected to said valves and having fluid chambers on opposite sides thereof one of which is connected to said vacuum line and the other of which is said atmospheric chamber, said fluid chambers normally maintaining differential pressures on opposite sides of said diaphragm to maintain said valves in said normal positions, and means weaker than said normal differential pressure and connected to said valves for biasing said valves from their normal positions whereby a drop in vacuum in said first fluid chamber renders said biasing means operative to close said first valve and open said second valve.

4. A system according to claim 1 wherein said means subject to a predetermined drop in vacuum in said vacuum line comprises a diaphragm connected to said valves and having fluid chambers on opposite sides thereof one of which is connected to said vacuum line and the other of which is said atmospheric chamber, said fluid chambers normally maintaining differential pressures on opposite sides of said diaphragm to maintain said valves in said normal positions, means weaker than said normal differential pressure and connected to said valves for biasing said valves from their normal positions whereby a drop in vacuum in said first fluid chamber renders said biasing means operative to close said first valve and open said second valve, and means connected to said valves and operative upon initial movement of said second valve from closed position for applying a supplemental biasing force assisting said biasing means in closing said first valve.

5. In a remote control brake system having power means including a vacuum line providing vacuum power for applying the brakes, a control line to be normally subjected to a vacuum condition to provide a released brake condition and providing a brake-applied condition when subjected to higher pressure, remote means responsive to pressures in one end of said control line to control said power means, and means connected to the other end of said control line for effecting variations in pressure therein, in combination, a valve device between said ends of said control line comprising a control chamber directly communicating with said one end of said control line and having a port normally connecting it to said other end of said control line, a normally open first valve controlling said port, an atmospheric chamber having a valve seat between such chamber and said control chamber, a normally closed second valve engaging said seat and connected to said first valve, said atmospheric chamber having a restricted port connecting it to the atmosphere, a diaphragm having one side subject to pressure in said atmospheric chamber and connected to said valves, a vacuum chamber at the other side of said diaphragm communicating with said vacuum line, pressure in said atmospheric chamber serving to maintain said valves in said normal positions, and means biasing said valves for movement to close said first valve and open said second valve when vacuum in said vacuum chamber decreases to a predetermined extent.

6. A system according to claim 5 provided with supplemental biasing means connected to said valves to be operative upon initial movement of said second valve from closed position to assist said first-named biasing means in closing said first valve.

7. In a remote control brake system having power means including a vacuum line providing vacuum power for applying the brakes, a control line to be normally subjected to a vacuum condition to provide a released brake condition and providing a brake-applied condition when subjected to higher pressure, remote means responsive to pressures in one end of said control line to control said power means, and means connected to the other end of said control line for effecting variations in pressure therein, in combination, a valve device between the ends of said control line comprising a housing having a chamber therein in open communication with said one end of said control line, said housing having axially alined ports one of which is in open communication with said other end of said control line and the other of which communicates with the atmosphere, a pair of connected coaxial valve elements one of which is normally open and is adapted to close said one port and the other of which normally closes said other port, and means connected to said valve elements and subject to a drop in vacuum in said vacuum line for closing said one valve element and opening said other valve element to admit air into said chamber and into said one end of said control line to apply the brakes.

8. A system according to claim 7 provided with biasing means connected to said valve elements and operative upon initial movement of said other valve element from closed position for exerting an axial force for assisting in moving said one valve element to closed position.

9. A system according to claim 7 wherein said means subject to a drop in vacuum in said vacuum line comprises a diaphragm, an atmospheric chamber open to said other port and to the pressure in which chamber one side of said diaphragm is subject, a vacuum chamber at the other side of said diaphragm connected to said vacuum line, differential pressures on opposite sides of said diaphragm tending to hold said first valve element in open position, and a spring having mechanical connection with said valve elements and exerting a biasing force tending to close said one valve element and open said other valve element and normally overcome by said differential pressure, said spring becoming operative to move said one valve element to closed position and open said other valve element when said differential pressure drops incident to a drop in vacuum in said vacuum chamber.

10. A system according to claim 7 wherein said means subject to a drop in vacuum in said vacuum line comprises a diaphragm, an atmospheric chamber open to said other port and to the pressure in which chamber one side of said diaphragm is subject, a vacuum chamber at the other side of said diaphragm connected to said vacuum line, differential pressures on opposite sides of said diaphragm tending to hold said first valve element in open position, and a spring having mechanical connection with said valve elements and exerting a biasing force tending to close said one valve element and open said other valve element and normally overcome by said differential pressure, said spring becoming operative to move said one valve element to closed position and open said other valve element when said differential pressure drops incident to a drop in vacuum in said vacuum chamber, said atmospheric chamber having a restricted port open to the atmosphere and of substantially smaller area than said other port.

11. A system according to claim 7 wherein said means subject to a drop in vacuum in said vacuum line comprises a diaphragm, an atmospheric chamber open to said other port and to the pressure in which chamber one side of said diaphragm is subject, a vacuum chamber at the other side of said diaphragm connected to said vacuum line, differential pressures on opposite sides of said diaphragm tending to hold said first valve element in open position, and a spring having mechanical connection with said valve elements and exerting a biasing force tending to close said one valve element and open said other valve element and normally overcome by said differential pressure, said spring becoming operative to move said one valve element to closed position and open said other valve element when said differential pressure drops incident to a drop in vacuum in said vacuum chamber, and a biasing means connected to said valve elements to transmit negligible axial force to said valve elements when the latter are in said normal positions and to exert a supplemental axial biasing force tending to close said one valve element when said valve elements initially move away from their normal positions.

12. In a tractor-trailer brake system wherein the tractor is provided with a source of vacuum and a pedal-controlled normally vacuum-suspended booster motor energizable by disconnecting one end of said motor from said source and connecting it to the atmosphere to apply the tractor brakes, and wherein the trailer is provided with a vacuum reservoir, vacuum-operated tractor brake-applying motors and a conversion valve connected between said reservoir and said motors, and wherein a control line has a forward end connected to said booster motor and a rear end connected to said conversion valve, said control line when normally subjected to vacuum providing a released brake condition and providing a brake applied condition for the trailer when subjected to higher pressure, and wherein a vacuum line connects said reservoir to a source of vacuum; a valve device connected between said ends of said control line and comprising a chamber directly communicating with said rear end of said control line and having a port normally connecting it to said forward end of said control line, a first valve controlling said port and normally open to provide unrestricted communication through said control line, a valve seat communicating with the atmosphere, a second valve connected to said first valve and normally engaging said seat to disconnect the rear end of said control line from the atmosphere, and pressure responsive means connected to said valves and having fluid connection with said vacuum line to be subject to a drop in vacuum in said vacuum line for closing said first valve and opening said second valve.

13. A system according to claim 12 wherein said pressure responsive means for closing said first valve and opening said second valve comprises a diaphragm having a vacuum chamber at one side communicating with said vacuum line and an atmospheric chamber at the other side open to said valve seat whereby differential pressure normally maintains said valves in said normal positions, and means weaker than said differential pressure connected to and biasing said valves to close said first valve and open said second valve when said differential pressure drops incident to a predetermined drop in vacuum in said vacuum chamber.

14. A system according to claim 12 wherein said pressure responsive means for closing said first valve and opening said second valve comprises a diaphragm having a vacuum chamber at one side communicating with said vacuum line and an atmospheric chamber at the other side open to said valve seat whereby differential pressure normally maintains said valves in said normal positions, and means weaker than said differential pressure connected to and biasing said valves to close said first valve and open said second valve when said differential pressure drops incident to a drop in vacuum in said vacuum chamber, said atmospheric chamber having restricted communication with the atmosphere.

15. A system according to claim 12 wherein said means for closing said first valve and opening said second valve comprises a diaphragm having a vacuum chamber at one side communicating with said vacuum line and an atmospheric chamber at the other side open to said valve seat whereby differential pressure normally maintains said valves in said normal positions, and means weaker than said differential pressure biasing said valves to close said first valve and open said second valve when said differential pressure drops incident to a drop in vacuum in said vacuum chamber, a valve stem connected between said valves, and a snap-over spring having a radially inner portion engaging said valve stem and exerting a force substantially perpendicular thereto when said valves are in said normal positions, initial movement of said second valve from said normal position inclining the application of force from said snap-over spring to said valve stem to apply a supplemental force to said valve stem tending more rapidly to close said first valve and open said second valve.

16. A system according to claim 12 wherein said means for closing said first valve and opening said second valve comprises a diaphragm having a vacuum chamber at one side communicating with said vacuum line and an atmospheric chamber at the other side open to said valve seat whereby differential pressure normally maintains said valves in said normal positions, and means weaker than said differential pressure biasing said valves to close said first valve and open said second valve when said differential pressure drops incident to a drop in vacuum in said vacuum chamber, a valve stem connected between said valves, and a snap-over spring having a radially inner portion engaging said valve stem and exerting a force substantially perpendicular thereto when said valves are in said normal positions, initial movement of said second valve from said normal position inclining the application of force from said snap-over spring to said valve stem to apply a supplemental force to said valve stem tending more rapidly to close said first valve and open said second valve, said atmospheric chamber having communication with the atmosphere through a restricted port of substantially smaller area than said valve seat, whereby, when said second valve initially opens, a drop in pressure will occur in said atmospheric chamber to accentuate the drop in said differential pressure to accelerate movement of said valves.

References Cited in the file of this patent

UNITED STATES PATENTS

| | | |
|---|---|---|
| 1,685,855 | McCune | Oct. 2, 1928 |
| 2,099,453 | Searle | Nov. 16, 1937 |
| 2,127,890 | Sills et al. | Aug. 23, 1938 |
| 2,215,172 | Christensen | Sept. 17, 1940 |
| 2,463,172 | Gunderson | Mar. 1, 1949 |
| 2,645,308 | Fitch et al. | July 14, 1953 |
| 2,694,468 | Price | Nov. 16, 1954 |
| 2,703,631 | Hupp | Mar. 8, 1955 |